United States Patent [19]
Habanec

[11] 3,779,118
[45] Dec. 18, 1973

[54] BLANK CUTTING MACHINE
[75] Inventor: Charles E. Habanec, Westchester, Ill.
[73] Assignee: Moser Paper Company, Chicago, Ill.
[22] Filed: Aug. 24, 1971
[21] Appl. No.: 174,391

[52] U.S. Cl.................... 83/437, 83/562, 83/648, 83/658, 83/699
[51] Int. Cl............................ B26d 7/06, B26d 7/26
[58] Field of Search.................... 83/547, 557, 561, 83/562, 658, 648, 437, 467, 409, 415, 401, 698, 699, 700

[56] References Cited
UNITED STATES PATENTS
| | | | |
|---|---|---|---|
| 3,370,492 | 2/1968 | Treff | 83/561 X |
| 2,792,883 | 5/1957 | Pokorski | 83/658 X |
| 3,518,908 | 7/1970 | Daniels | 83/409 X |
| 148,083 | 3/1874 | Partz | 83/415 |
| 1,777,313 | 10/1930 | Kent | 83/409 |

FOREIGN PATENTS OR APPLICATIONS
| | | | |
|---|---|---|---|
| 500,554 | 6/1930 | Germany | 83/562 |

*Primary Examiner*—Frank T. Yost
*Attorney*—James P. Hume et al.

[57] ABSTRACT

A machine for cutting envelope blanks from a stack of paper stock. The machine includes a vertically movable die head which mounts die blades for longitudinal transverse and angular adjustability. The blades engage the stack of sheet stock supported on a horizontally movable die platen. The platen surface is defined by a sheet of vinyl tile attached to a base member with adhesive so as to be readily removable.

3 Claims, 7 Drawing Figures

INVENTOR.
Charles E. Habanec
BY Richard G. Lione
Attorney.

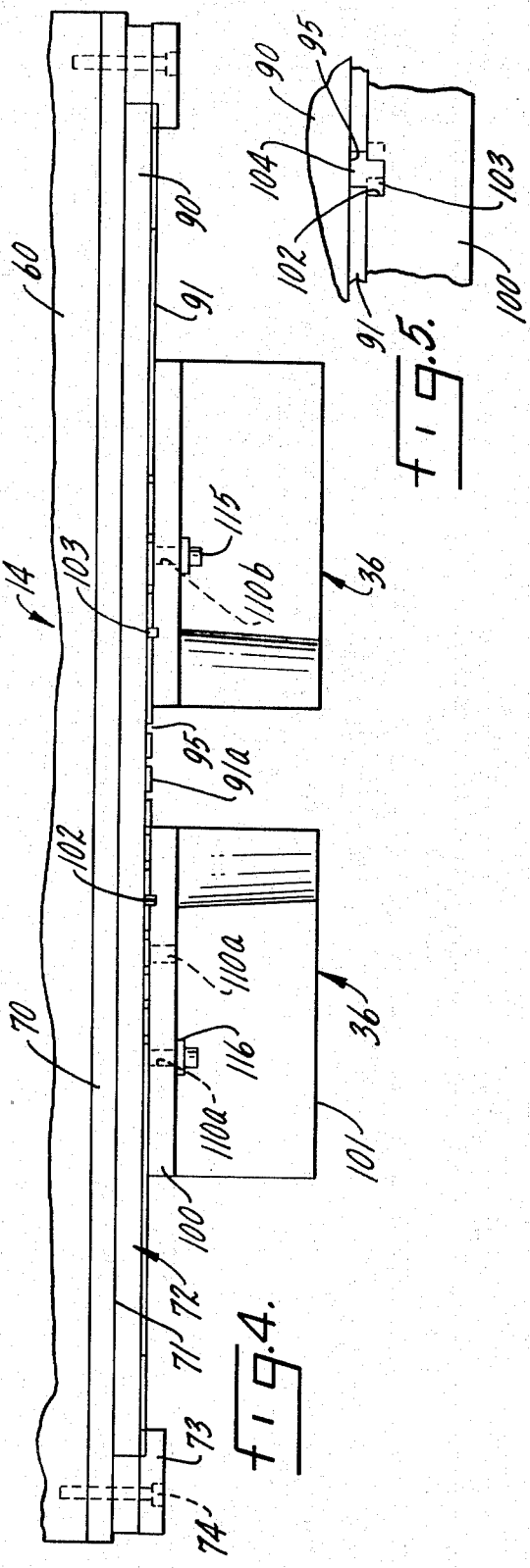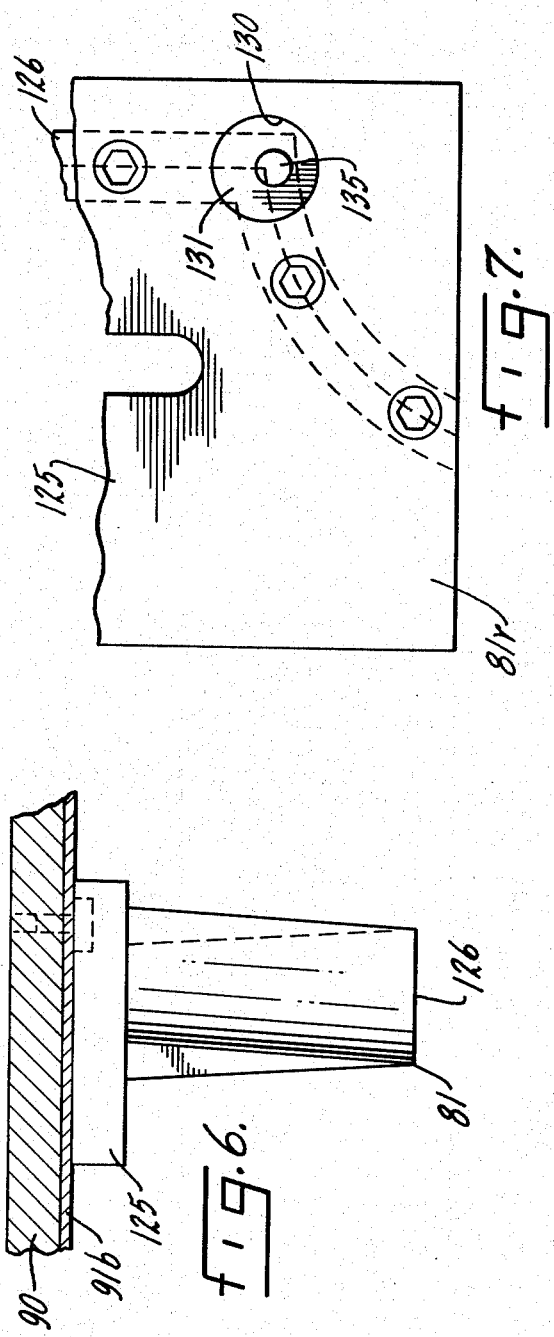

BLANK CUTTING MACHINE

The foregoing and other objects are realized in accord with the present invention by providing an envelope blank die cutting machine including a die block platen movable into and out of operational relationship under an upper, movable die assembly on rollers seated in the machine frame piers. The platen incorporates a Masonite body on which is positioned a vinyl tile cutting board. The cutting board is, according to the invention, glued on the Masonite so that it is securely retained but, nevertheless, can be removed and replaced periodically both simply, economically and expeditiously. Adjustable paper stops arranged along the rear edge and one side edge of the cutting board position a stack of envelope blank paper stock for cutting when the platen has moved back into engagement with limit stops at the rear of the machine, activating a limit switch which permits the movable die assembly to descend when actuated by the operator.

The upper or movable die assembly normally includes four blades adjustably seated on a head plate. The head plate is removable from guide slots in the head of the movable die assembly. The plate and blades cooperate, according to the invention, in providing a highly versatile blade adjustment arrangement which makes possible a wide range of blade settings and, accordingly, facilitates the die cutting of virtually an unlimited range of blank sizes. Adjustability longitudinally of the head assembly is possible in ⅛ inch increments, while transversely it is possible to made an infinitesimal number of small adjustments; practically speaking down to 0.001 inches in variations.

BRIEF DESCRIPTION OF THE DRAWINGS

FIG. 4 is a front elevational view of the die assembly;

FIG. 5 is an enlarged view of a mounting pin for an individual blade;

FIG. 6 is an enlarged sectional view taken along Line 6—6 of FIG. 3; and

FIG. 7 is an enlarged plan view of the top of a blade, with parts removed.

DESCRIPTION OF THE PREFERRED EMBODIMENT

Figure 1:
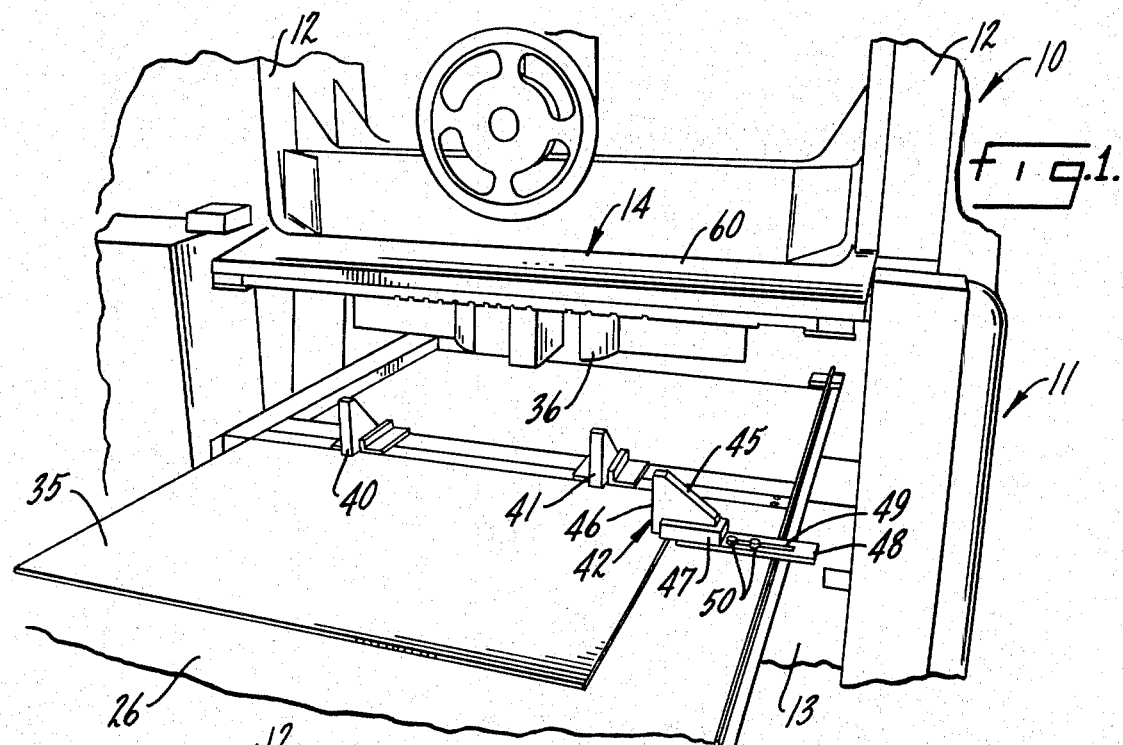
FIG. 1 is a front perspective view of an envelope cutting machine embodying features of the invention, with the die block platen of the fixed die assembly retracted into its paper loading position.
Figure 2:
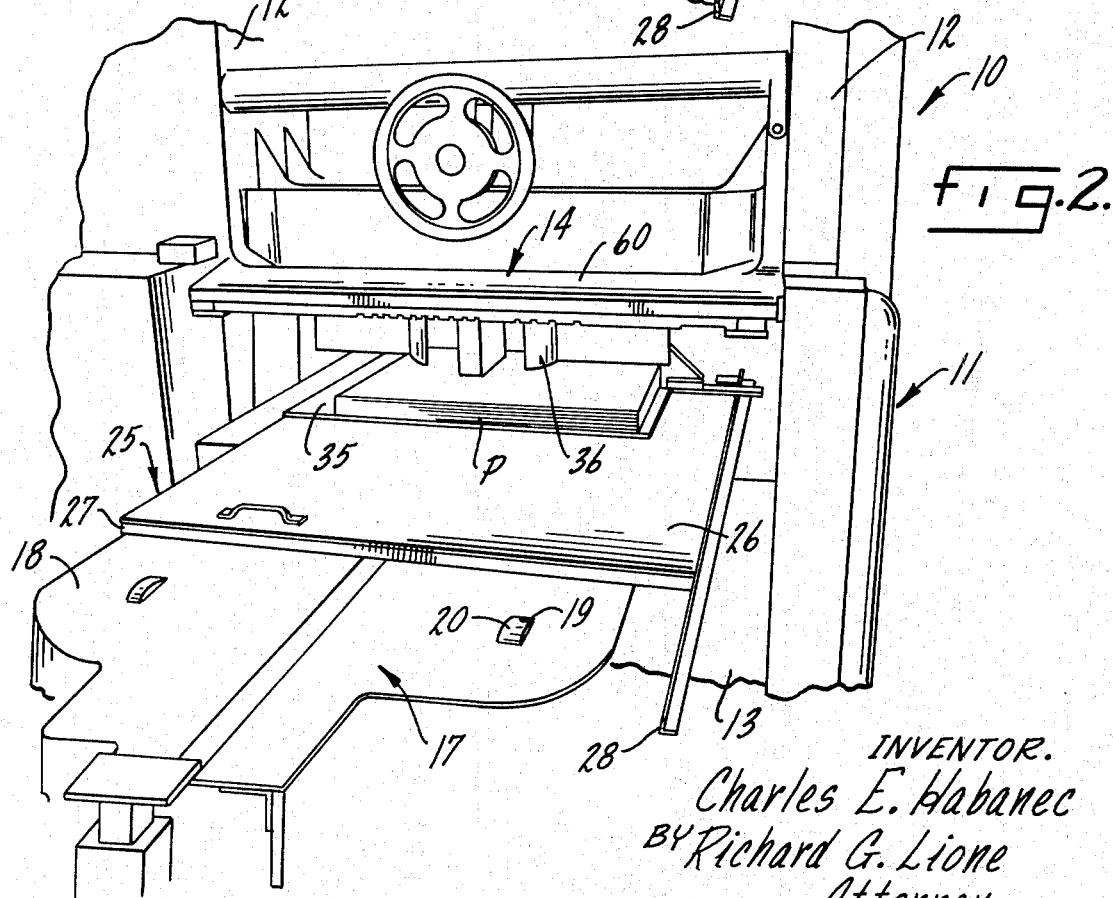
FIG. 2 is a front perspective view of the machine with the die block platen loaded and in die cutting position.

Referring now to the drawings, and particularly to FIGS. 1 and 2, a machine for die cutting envelope blanks and embodying features of the present invention is illustrated generally at 10. The machine 10 comprises a frame 11 including side frame sections 12. The side frame sections 12 are connected at their base by a bed assembly 13 and at their upper extremities by a head assembly 14. In essence, the frame 11 is conventional in construction, so it is not described in further detail except insofar as related to the structure of the machine which forms the basis for the present invention.

The bed assembly 13 includes a bed table 17 which extends from front to back of the machine, between the side frame sections 12 thereof, at a suitable working level for the operator. The bed table 17 has a generally flat upper surface perforated, as at 19, in a series of locations extending longitudinally through the side frame sections, adjacent opposite sides of the bed table, to expose rollers 20 journalled in the bed table 17 beneath its upper surface 18 and extending slightly up through the perforations 19.

Mounted on the bed table 17 upper surface 18 or, more precisely, on the exposed rollers 20, for movement longitudinally of the table between the side frame sections 12 is the "fixed" die platen 25 — fixed in the sense that it is not adapted for vertical movement between the side frame sections. The fixed die platen 25 comprises a heavy Masonite board which is rectangular in configuration and has a flat or planar upper surface 26. The straight side edges 27 of the platen 25 extend into loose, sliding engagement with side rails 28 coextensive with the bed table 17 and mounted on it, on either side of the flat upper surface 18. The side rails 28 guide the die platen 25 for movement longitudinally of the machine 10 between the side frame sections 12. In the present illustration, the side rails 28 are fabricated of conventional angle iron stock secured in a conventional manner to the bed assembly 13.

Glued to the upper surface 26 of the fixed die platen 25 with a conventional contact adhesive is a rectangular cutting board 35 fabricated of vinyl plastic tile approximately ¼ inch thick. The cutting board 35 is rectangular in shape and large enough so that the die cutting blades 36 secured to the movable head assembly 14 of the envelope cutting machine 10 descend to and cut envelope blanks from the stack of paper stock (see FIG. 2), all within the boundaries or confines of the cutting board 35. The glue used to cement the cutting board 35 to the fixed die platen 25 surface 26 provides a secure bond between the cutting board 35 and the surface 26 so that the die platen 25, while permitting the cutting board 35 to be removed relatively easily and replaced once it becomes marred to the extent that its further use would affect the accuracy of envelope blank cutting.

To properly position a stack P of blank paper stock on the cutting board 35, the fixed die platen 25 mounts three paper stops 40–42. The paper stops 40 and 41 are spaced transversely of the fixed die platen 25 adjacent its rear edge and provide a backstop for the stack P of blank paper. The paper stop 42 is positioned adjacent the right lateral side edge 27 of the die platen 25 and provides a side positioning stop for the stack P of paper. The paper stops 40–42 are identical in construction and operation so only one, the side stop 42, is described in substantial detail and corresponding reference numerals are applied, where appropriate, to the remaining stops 40 and 41.

The stop 42 comprises a generally triangular shaped wood block 45 having a vertically elongated, inner positioning surface 46. The block is seated in and affixed to a generally U-shaped base 47 which is, in turn, attached with conventional machine screws to an adjustable mounting plate 48.

An elongated slot 49 is formed through the mounting plate 48 and mounting bolts 50, with their heads positioned above the plate 48, extend through the slot 49 and secure the plate and, accordingly, the paper stop block 45, to the fixed die platen 25. As will be recognized, by loosening the bolts 50 the stop 42 is easily moved inwardly or outwardly of the corresponding side edge 27 (in this case) of the die platen 25 to position the vertically elongated block surface 46 for a selected paper stock size. The mounting plate 48 is substantially the same thickness as the cutting board 35 and, accordingly, the positioning block 45 slides snuggly over the surface of the cutting board 35 as adjustment is made in the aforedescribed manner.

The construction and adjustment capability of the paper stops 40 and 41 is identical to the stop 42, as hereinbefore pointed out. As is obvious, however, though independently adjustable, the stops 40 and 41 are adjusted together in substantially precise alignment with each other to properly position a stack P of paper stock.

Turning now to the head assembly 14 and the mounting of the cutting blades 36 according to the invention, attention is directed to FIG 4. The head assembly 14 comprises a vertically movable die head 60 mounted on, and slidable between the side frame sections 12 of the machine frame 11 in a conventional manner. Since the machine 10 is a mechanical press, the die head 60 is moved vertically in a cutting cycle between the side frame sections 12 through suitable gearing (not shown) and power supplied by a power source of conventional construction; i.e., an electric motor, for example. Movement of the die head 60 by the power source in a well-known manner is effected by the operator through a suitable electrical control system of conventional construction (not shown) from an operator button console (not shown).

The die head 60 includes a cast die head body 70, also of conventional construction, and of substantial mass. Removably secured to the lower surface 71 of the die head body 70 is a cutting blade mounting plate 72. The plate 72, which mounts the cutting blades 36 in accord with the present invention so as to afford a wide range of adjustment capability is slidably received in mounting tracks 73 extending longitudinally of the head body 70 along its sides. With the plate 72 seated in tracks 73, locking bolts 74 are tightened on the plate 72 to affix it securely in a selected position on the tracks 73.

Figure 3:
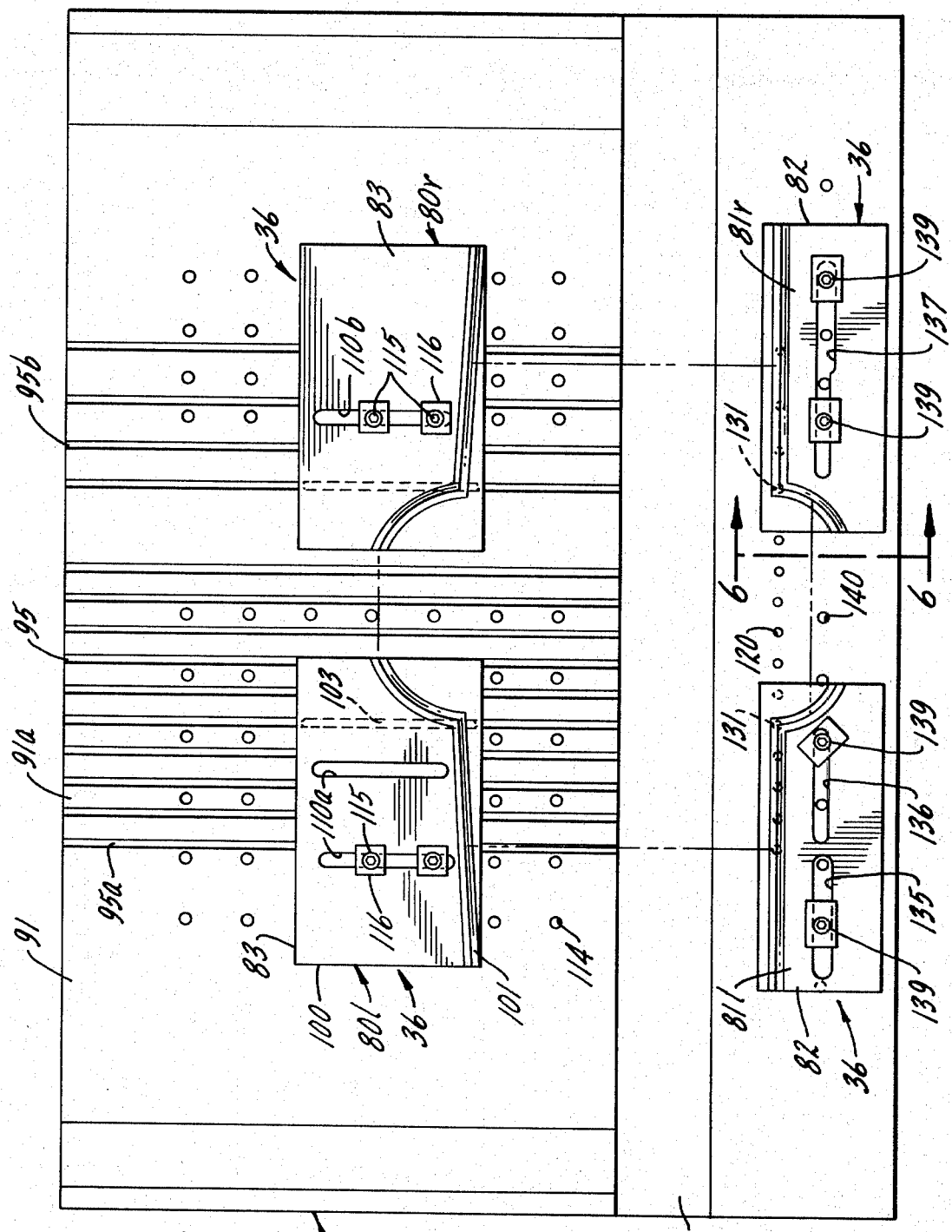
FIG. 3 is a bottom plan view of the movable die assembly or head assembly including the head plate on which four die cutting blades are adjustably mounted according to the invention.

Referring now to FIG. 3, a bottom plan view of the mounting plate 72 with four cutting blades 36 affixed in position on it is illustrated. The blades 36 comprise two front blades 80 which are identical to each other in mirror image and, in the same manner, two rear blades 81. The rear blades 81 are, according to the invention, adjustable transversely of the plate; i.e., across the width of the machine 10, in ⅛ inch increments on a rear blade mounting assembly 82 embodying features of the invention. This mounting assembly 82 also permits angular adjustment. The front blades 80 are, on the other hand, afforded an infinite number of longitudinal adjustments by the mounting assembly 83 provided for them according to the invention, while transversely of the mounting plate 72 they are also adjustable in ⅛ inch increments. As a result, it will be recognized that virtually an infinite number of envelope blank sizes and shapes can be cut with the machine 10 according to the invention, within the limits of the size of the mounting plate 72 and the cutting board 35, of course.

The head plate 72 is actually a laminated structure including a relatively thick "roof" plate 90 to which are secured a plurality of floor plate sections 91. The floor plate sections 91 include plate sections 91a which are disposed longitudinally of the head plate 72; i.e., from front to back of the plate 72 between the side frame sections 12 with the head plate 72 in mounted position on the die head body 70, and plate sections 91b which extend transversely of the roof plate 90. The plate sections 91a are fastened to the roof plate 90 on the forwardmost two-thirds of the plate, as best illustrated in FIG. 3, and define on the bottom of the head plate 72 a series of longitudinally extending slots 95. As illustrated, a first series of ten of these slots 95a are spaced at equal intervals of ¾ inches apart. A second series of four of these slots 95b are spaced at increasing ¼ inch intervals from one inch to one and one-half inches.

The front blades 80L and 80R, blades 80L being on the left in FIG. 3 and blades 80R being on the right of series one, are keyed in the slots 95a and the slots 95b of series two, respectively. To this end, each of the blades 80L and 80R comprises a footing plate 100 which is rectangular in configuration and mounts, on its lower surface, an irregularly shaped blade member 101. The blade member 101 is, in each instance, preferably fastened to the footing plate 100 by suitable machine screws extending through the plate. Each blade member 101 is irregularly shaped, in a well-known manner, to cut one corner or make one quadrant cut in a stack P of paper stock. The blade members 101 are, in the cases of the front blades 80L and 80R, mounted in mirror-image relationship to each other on the footing plates 100.

The upper surface of each footing plate 100 has a longitudinally extending ¼ inch wide groove 102 formed therein, adjacent the innermost edge of the corresponding plate (see FIG. 5). This groove 102 is adapted to receive a key bar 103 so that the key bar is, in itself, flush with the top of the corresponding plate 100. Each key bar is fastened to the footing plate with suitable machine screws.

A key rib 104 is formed on the upper surface of each key bar 103 and extends substantially its entire length. The key rib 104 is offset one-sixteenth from the longitudinal center line of the corresponding key bar 103. Accordingly, by merely removing the key bar 103 and reversing its relationship to the footing plate 100, before seating it and fastening it in place again, the key rib 104 position relative to the footing plate 100 is changed by ⅛ inch, as will be recognized. Accordingly, since the seating of the key rib 104 in a selected slot 95 on the head plate 72 fixes the lateral position of each of the front blades 80L and 80R, it will be seen that this lateral position cannot only be varied by the distance between the slots 95, but also in ⅛ inch increments relative to these slots by merely reversing the key bar 103 mounting arrangement.

To fasten the blades 80L and 80R to the bottom surface of the floor plate sections 91a, longitudinally extending apertures are formed through the footing plates 100. Two of such longitudinally extending apertures 110a are formed in the plate 80L and one aperture 110b through the plate 80R.

Keeping in mind that the plate 80L is designed to be mounted so that its key 104 is seated in evenly spaced slots 95a and the plate 80R is designed to be mounted so that its key 103 seats in slots 95b which are unevenly spaced, the longitudinally extending apertures 110a and 110b are so positioned on the plates so that regardless of which slot the corresponding plate is mounted in, at least one of the elongated apertures 110a is aligned with a series of longitudinally spaced stud bolt receptacles 114 while the elongated aperture 110b is also aligned with another series of longitudinally spaced stud bolt receptacles 114.

Stud bolts 115 are seated in corresponding ones of the stud bolt receptacles 114. These stud bolts 115 extend through the elongated apertures 110a and 110b in the footing plates 100. The footing plates 100 are then secured snugly to the roof plate 90 of the head plate 72 by conventional nuts and washers 116 secured to the stud bolts 115.

Turning now to the rear of the head plate 72, the transversely extending floor plate sections 91b do not have slots formed therein. Rather, the widest of these transversely extending floor plate sections 91b has a transversely aligned series of ¼ inch pin holes 120 formed in it. The pin holes 120 are regularly spaced on inch apart at their centers in the region of the left rear blade 81L and irregularly spaced 1 ¾ inches apart, 1 ¼ inches apart, 1 ½ inches apart, and 1 ¾ inches apart in the region of the right rear blade 81R. As hereinafter discussed in detail, these pin holes are used as positioning apertures for the rear blades 81L and 81R on the head plate 72.

The rear blades 81L and 81R have, in essence, the same construction as the front blades 80L and 80R, hereinbefore discussed. In this regard, each comprises a footing plate 125 mounting a blade member 126 in a conventional manner, as with machine screws. The blade members 126 are irregularly shaped in mirror-image of each other to cut corresponding left and right rear corners or quadrants of the stack P of paper stock being made into envelope blanks by the machine 10. Their shape is slightly different from the blade members 80 hereinbefore discussed, but this is unimportant to the invention.

Formed in the upper surface of the footing plates 125 of each of the rear blades 81L and 81R, adjacent the innermost corner of the corresponding footing plate 125, is a relatively large cylindrical depression or seat 130. Mounted in the seat 130, snugly but for free rotation on its own axis, is a cylindrical positioning disc 131. The disc 131 is so received in the seat 130 that it is flush with the upper surface of the footing plate 125. Each disc 131 carries an upwardly extending positioning pin 135, extending approximately ¼ inch from the surface of the disc 131. The positioning pin 135 is affixed to the disc 131 1/16 inch off-center from the axis of rotation of the disc and is adapted to be snugly but freely received in a selected one of the pin holes 120 in the floor plate section 91b of the head plate 72.

By positioning a set of rear blades 80L and 80R on the floor plate sections 91b with corresponding pins 135 in selected pin holes 120, the corners 136 of the blade members 80L and 80R are fixed as to position within ⅛ inch of their desired position. Rotating the positioning discs 131 permits adjustment to the precisely selected position. The blades 80L and 80R can then be angularly adjusted within limits and securely fastened to the plate 72 according to the invention.

To fasten the footing plates 125 securely to the floor plate section 91b, the footing plates are formed with transversely extending slots 135 and 136 on the blade 81L and slot 137 on the blade 81R. The slots 135 and 136 are transversely aligned with each other, the outside slot 135 being slightly wider than the inside slot 136. The slot 137 is a single slot, but its outermost half-section is wider than its innermost half section, as will be noted.

The footing plates 125 are fastened to the floor plate sections 91b by stud bolt, washer, and nut assemblies 139 identical to those hereinbefore discussed in relation to the front blades 80L and 80R. The stud bolts extend into threaded stud bores 140 arranged in transverse alignment through the floor plate sections 91b. By virtue of the fact that the slot 135 in the blade 80L and the outermost end of the slot 137 in the blade 80R are substantially wider than the stud bolts, the footing plates 135 can be pivoted slightly about their mounting pins 131. As a result, the blade members can be angularly adjusted to achieve slightly varying envelope shapes according to the invention.

With the four blades 36 mounted in the aforedescribed manner, their positioning on the head 72 can be varied to an astonishing degree to achieve various envelope blanks and sizes. As a result, the versatility of the machine is further enhanced.

While the embodiment described herein is at present considered to be preferred, it is understood that various modifications and improvements may be made therein.

What is desired to be claimed and secured by Letters Patent of the United States is:

1. A machine for cutting envelope blanks from a stack of paper stock, comprising:
   a. frame means,
   b. vertically movable die head means mounted on said frame means,
   c. said die head means including a die head having a die plate removably secured to the lower surface of the die head,
   e. said blade means comprising left and right front blades and left and right rear blades,
   f. each of said blades secured to a base plate forming part of said blade means,
   g. each of said base plates being adjustably mounted for selective positioning on said die plate,
   h. bed means connected in said frame means below said die head means,
   i. die block means on said bed means horizontally movable between an operational position immediately under said die head means and a loading position removed from said position immediately under said die head means,
   j. said die block means including a non-metallic body member and a relatively thin cutting board removably secured to the upper surface of said body member,
   k. said cutting board comprising a sheet of plastic material.

2. The machine of claim 1 further characterized in that:
   a. a front section of said die plate lower surface has a series of longitudinally extending grooves therein,
   b. a back section of said die plate lower surface has a transversely extending series of generally cylindrical apertures formed therein,
   c. at least one of said front blades having a ridge extending from the mounting surface of its base plate and adapted to seat in a selected groove on said front section, d. at least one of said rear blades having a rotatable disk seated in the mounting surface of its base plate with a pin protruding from said disk in eccentric relationship to the axis of the disk, e. said pin on said rotatable disk adapted to seat in a selected one of said apertures on said back section.

3. A machine for cutting envelope blanks from a stack of paper stock, comprising:

a. frame means, b. vertically movable die head means mounted on said frame means, c. bed means in said frame means below said die means, d. die block means on said bed means horizontally movable on roller means between an operational position immediately under said die head means and a loading position removed from said position immediately under said die head means, e. said movable die head means including a die head having a die plate removably secured to the lower surface of the die head, f. blank cutting blade means fastened to the lower surface of the die plate, g. said blade means comprising left and right front blades and left and right rear blades, h. each of said blades secured to a base plate, i. a front section of said die plate lower surface having a series of longitudinally extending grooves therein, j. a back section of said die plate lower surface having a transversely extending series of generally cylindrical apertures formed therein, k. at least one of said front blades having a ridge extending from the mounting surface of its base plate and adapted to seat in a selected groove on said front section, l. at least one of said rear blades having a rotatable disk seated in the mounting surface of its base plate with a pin protruding from said disk in eccentric relationship to the axis of the disk, m. said pin on said rotatable disk adapted to seat in a selected one of said apertures on said back section.

* * * * *